United States Patent
Kim et al.

(10) Patent No.: US 10,056,628 B2
(45) Date of Patent: Aug. 21, 2018

(54) METHOD FOR CONTROLLING STARTUP OF FUEL CELL VEHICLE

(71) Applicants: Hyundai Motor Company, Seoul (KR); Kia Motors Corporation, Seoul (KR)

(72) Inventors: Dae Jong Kim, Gyeonggi-do (KR); Jung Jae Lee, Gyeonggi-do (KR); Ki Chang Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 166 days.

(21) Appl. No.: 15/295,488

(22) Filed: Oct. 17, 2016

(65) Prior Publication Data
US 2017/0294666 A1  Oct. 12, 2017

(30) Foreign Application Priority Data
Apr. 7, 2016 (KR) .................. 10-2016-0042572

(51) Int. Cl.
| | |
|---|---|
| H01M 8/04 | (2016.01) |
| H01M 8/04746 | (2016.01) |
| H01M 8/043 | (2016.01) |
| H01M 8/04298 | (2016.01) |
| H01M 8/04082 | (2016.01) |
| H01M 8/04089 | (2016.01) |
| H01M 8/04223 | (2016.01) |

(Continued)

(52) U.S. Cl.
CPC ....... *H01M 8/04753* (2013.01); *H01M 8/043* (2016.02); *H01M 8/0432* (2013.01); *H01M 8/04082* (2013.01); *H01M 8/04089* (2013.01); *H01M 8/04223* (2013.01); *H01M 8/04225* (2016.02); *H01M 8/04298* (2013.01); *H01M 8/04302* (2016.02); *H01M 8/04303* (2016.02); *H01M 8/04552* (2013.01); *H01M 2250/20* (2013.01)

(58) Field of Classification Search
None
See application file for complete search history.

(56) References Cited

U.S. PATENT DOCUMENTS

| 9,583,774 B2 | 2/2017 | Boegershausen et al. |
| 2004/0185316 A1* | 9/2004 | Wells ............... H01M 8/04007 429/429 |

(Continued)

FOREIGN PATENT DOCUMENTS

| JP | 2002-158026 A | 5/2002 |
| JP | 2004-030979 A | 1/2004 |

(Continued)

*Primary Examiner* — Scott J. Chmielecki
(74) *Attorney, Agent, or Firm* — Mintz Levin Cohn Ferris Glovsky and Popeo, P.C.; Peter F. Corless (57) ABSTRACT

A method for controlling startup of a fuel cell vehicle is provided. The method includes starting to adjust supply of hydrogen and air to a fuel cell and setting a control voltage of a side of a main bus end of a converter disposed between the main bus end and a high-voltage battery to a predetermined lowest control voltage. An output voltage of the side of the main bus end of the fuel cell and the control voltage of the side of the main bus end of the converter are then compared to adjust an amount of air supply to the fuel cell based on the comparison.

19 Claims, 4 Drawing Sheets

(51) Int. Cl.
*H01M 8/04302* (2016.01)
*H01M 8/04303* (2016.01)
*H01M 8/04225* (2016.01)
*H01M 8/0432* (2016.01)
*H01M 8/04537* (2016.01)

(56) References Cited

U.S. PATENT DOCUMENTS

| | | | | |
|---|---|---|---|---|
| 2007/0042233 | A1* | 2/2007 | Lyman | H01M 8/04567 429/9 |
| 2007/0292724 | A1 | 12/2007 | Gilchrist | |
| 2008/0257621 | A1* | 10/2008 | Saeki | B60L 11/005 180/65.31 |
| 2010/0203409 | A1* | 8/2010 | Manabe | H01M 8/04268 429/431 |
| 2010/0332063 | A1* | 12/2010 | Saeki | B60L 3/00 701/22 |
| 2011/0111318 | A1* | 5/2011 | Bernard | H01M 8/04089 429/431 |
| 2012/0062166 | A1* | 3/2012 | Thornton | C01B 3/34 320/101 |
| 2012/0321917 | A1* | 12/2012 | Kazuno | H01M 16/006 429/9 |
| 2013/0169253 | A1* | 7/2013 | Kaneko | H01M 8/04947 323/282 |
| 2015/0336471 | A1* | 11/2015 | Yoon | H01M 8/04626 701/22 |
| 2016/0141654 | A1* | 5/2016 | Saito | H01M 8/04089 429/446 |

FOREIGN PATENT DOCUMENTS

| | | |
|---|---|---|
| JP | 2006-286513 A | 10/2006 |
| JP | 2010-020923 A | 1/2010 |
| JP | 5286990 B2 | 9/2013 |
| JP | 2013-208001 A | 10/2013 |
| JP | 2013-232428 A | 11/2013 |
| KR | 10-2010-0010515 A | 2/2010 |
| KR | 10-2010-0035182 A | 4/2010 |
| KR | 10-2010-0051509 A | 5/2010 |
| KR | 10-2011-0028161 A | 3/2011 |
| KR | 10-1152856 B1 | 6/2012 |
| KR | 10-1234663 B1 | 2/2013 |
| KR | 2013-0124790 A | 11/2013 |
| KR | 10-2014-0078948 A | 6/2014 |
| KR | 10-2014-0087861 A | 7/2014 |
| KR | 10-1417677 B1 | 7/2014 |
| KR | 10-1449299 B1 | 10/2014 |
| KR | 10-2015-0043613 A | 4/2015 |
| KR | 2015-0078448 A | 7/2015 |
| WO | 2005/101561 A2 | 10/2005 |
| WO | 2007/149409 A2 | 12/2007 |

* cited by examiner

METHOD FOR CONTROLLING STARTUP OF FUEL CELL VEHICLE

CROSS REFERENCE TO RELATED APPLICATION

The present application claims priority to Korean Patent Application No. 10-2016-0042572 file Apr. 7, 2016, the entire contents of which is incorporated herein for all purposes by this reference.

BACKGROUND

1. Field of the Invention

The present invention relates to a method for controlling startup of a fuel cell vehicle, and more particularly, to a method for controlling startup of a fuel cell vehicle to secure rapid startability in a cold start condition by adjusting voltage of a fuel cell at a low level.

2. Description of the Related Art

A fuel cell is beneficially operated at a low voltage and a high current in a low temperature start condition, and adjusting the voltage at a lowest level allowed by the system in the same power output state leads to outputting a highest current and increasing the temperature of the fuel cell. Furthermore, even while the vehicle is operating normally (e.g., without error), performing constant-voltage operation control below a certain power output may minimize the high potential state of a fuel cell, thereby improving durability of the fuel cell.

The fuel cell has a type of relationship between the output current and the output voltage. When fuel gas (e.g., air and hydrogen) is supplied sufficiently, increasing the output current decreases the output voltage due to various polarization phenomena, referred to as I-V characteristics. Accordingly, in a fuel cell system, the voltage of a fuel cell is determined based on a current load of the fuel cell. Conventionally, like in the cold start condition, when the voltage of a fuel cell is required to be maintained less than a particular voltage level even when there is a change in vehicle load, the voltage of the fuel cell remains constant through precise control of hydrogen fuel gas. In particular, however, rapid temperature increase of the fuel cell required in the cold start has limitations since it is difficult to sufficiently decrease the voltage of the fuel cell.

The above information is presented as background information merely to assist with an understanding of the present invention. No determination has been made, and no assertion is made, as to whether any of the above might be applicable as prior art with regard to the present invention.

SUMMARY

Accordingly, the present invention provides a method for controlling startup of a fuel cell vehicle, to reduce a waiting period of ignition through rapid temperature increase of the fuel cell in a cold start condition.

The present invention provides a method for controlling startup of a fuel cell vehicle that may include starting, by a controller, to adjust supply of hydrogen and air to a fuel cell (start prep step), setting, by the controller, a control voltage of a side of a main bus end of a converter disposed between the main bus end and a high-voltage battery to a predetermined lowest control voltage (voltage prep step), and comparing, by the controller, an output voltage of a side of a main bus end of the fuel cell and the control voltage of the side of the main bus end of the converter, and adjusting, by the controller, an amount of air supply to the fuel cell based on the comparison (main control step).

The start prep step may include adjusting, by the controller, the opening of a hydrogen valve and an air valve. The main control step may include increasing an amount of air supply to the fuel cell when the output voltage of the side of the main bus end of the fuel cell is maintained to be the control voltage of the side of the main bus end of the converter. Additionally, the main control step may include reducing an amount of air supply to the fuel cell when the output voltage of the side of the main bus end of the fuel cell is greater than the control voltage of the side of the main bus end of the converter. The main control step may further include determining, by the controller, whether a high-voltage battery is in a fully charged state, and increasing an amount of air supply to the fuel cell when the high-voltage battery is not in the fully charged state.

Furthermore, the main control step may include comparing, by the controller, a charging amount of the high-voltage battery with a predetermined maximum charging amount to determine whether the high-voltage battery is in the fully charged state and comparing, by the controller, a charging current of the high-voltage battery with a predetermined maximum charging current to determine whether the high-voltage battery is in the fully charged state. The main control step may include determining, by the controller, whether a high-voltage battery is in a fully charged state, and increasing an amount of air supply to the fuel cell when the high-voltage battery is not in the fully charged state, and reducing an amount of air supply to the fuel cell when the high-voltage battery is in the fully charged state and the output voltage of the side of the main bus end of the fuel cell is greater than a lowest control voltage. The controller may be configured to perform the main control step at predetermined regular time intervals.

The main control step may include, when the high-voltage battery is fully charged and the output voltage of the side of the main bus end of the fuel cell is less than the lowest control voltage, reducing an amount of air supply to the fuel cell when the output voltage of the side of the main bus end of the fuel cell increases to a level greater than an output voltage from the previous main control step, and increasing an amount of air supply to the fuel cell when the output voltage of the side of the main bus end of the fuel cell decreases to a level less than the output voltage from the previous main control step.

Additionally, the main control step may be performed by the controller at predetermined regular time intervals, and a sub-control step may be performed by the controller between main control steps, the sub-control step comprising adjusting an amount of air supply based on adjustment of an amount of air supply performed in the previous main control step. The sub-control step may include maintaining an amount of air supply by a second amount of reduction until a next main control step is performed when the amount of air supply has increased in the previous main control step. The sub-control step may include reducing an amount of air supply by a first amount of reduction until a next main control step is performed when the amount of air supply has decreased in the previous main control step.

The first amount of reduction may be less than an amount of reduction of the air supply in the previous control step. The sub-control step may further include reducing an amount of air supply by a second amount of reduction until a next main control step is performed when the amount of air supply has been maintained in the previous main control step. The sub-control step may include reducing an amount of air supply by a second amount of reduction until a next main control step is performed when the amount of air supply has been maintained in the previous main control step, the second amount of reduction being less than the first amount of reduction.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the attached drawings. Reference now should be made to the drawings, in which the same reference numerals are used throughout the different drawings to designate the same or similar components. Notably, the various method described herein below may be executed by a controller having a memory and a processor.

Figure 1:
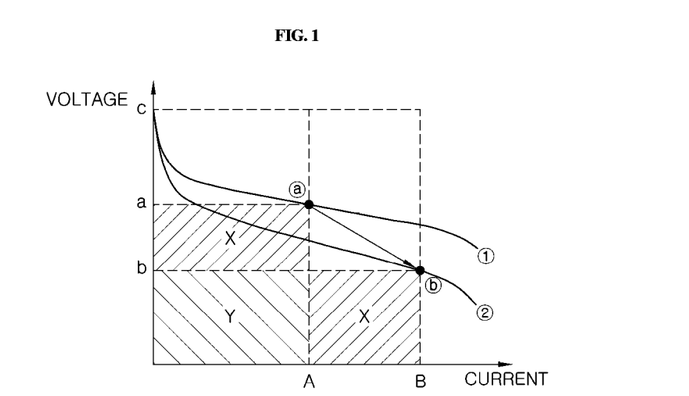
FIGS. 1 and 2 are current-voltage graphs illustrating a goal of a method for controlling startup of a fuel cell vehicle according to an exemplary embodiment of the present invention.
Figure 2:
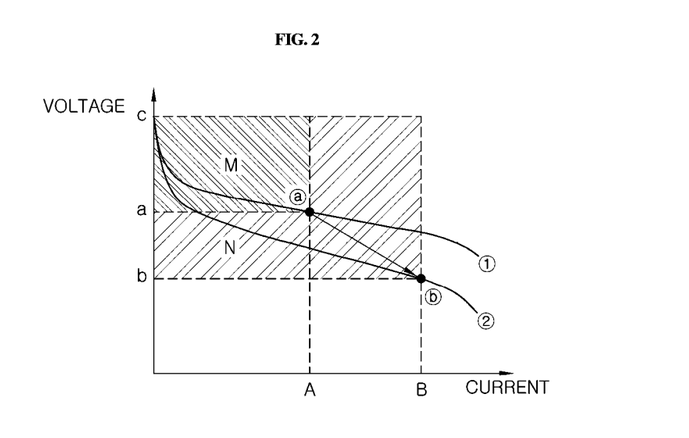
Figure 3:
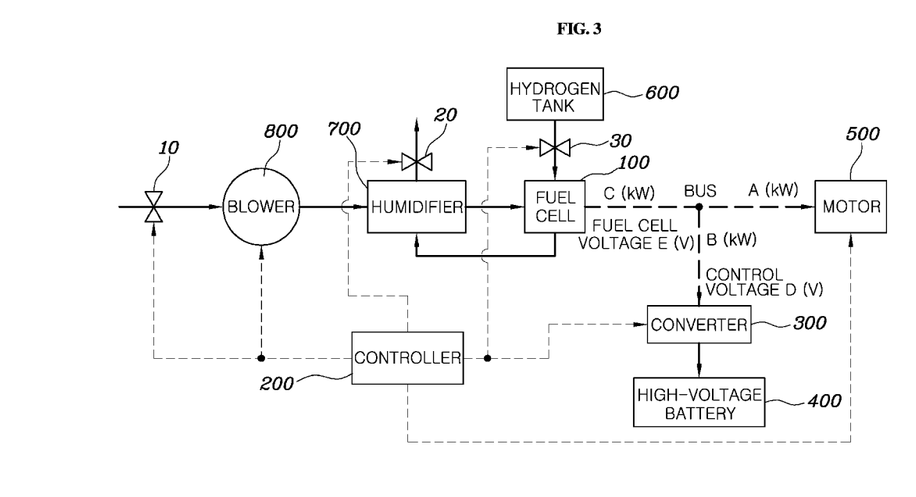
FIG. 3 is a block diagram of a system of a fuel cell vehicle for performing a method for controlling startup of a fuel cell vehicle according to an exemplary embodiment of the present invention.
Figure 4:
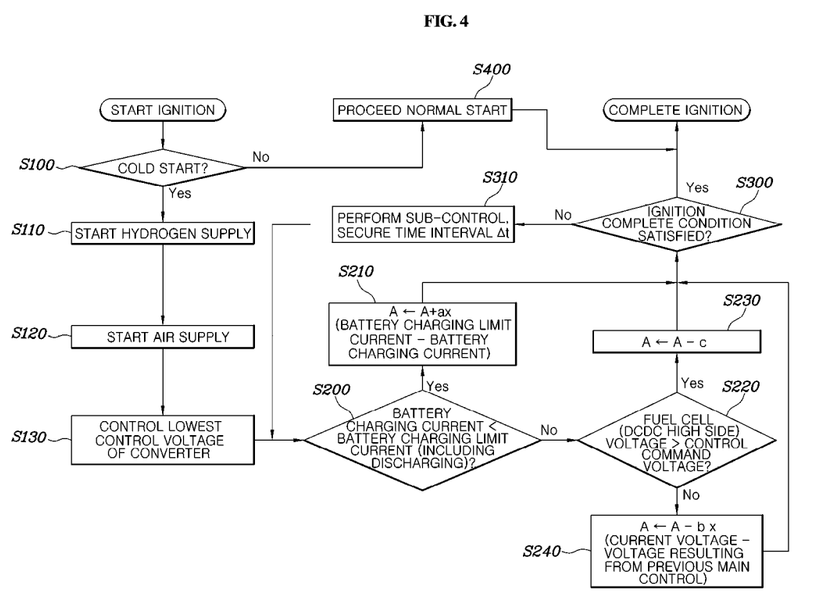
FIG. 4 is a flowchart illustrating a method for controlling startup of a fuel cell vehicle according to an exemplary embodiment of the present invention.
Figure 5:
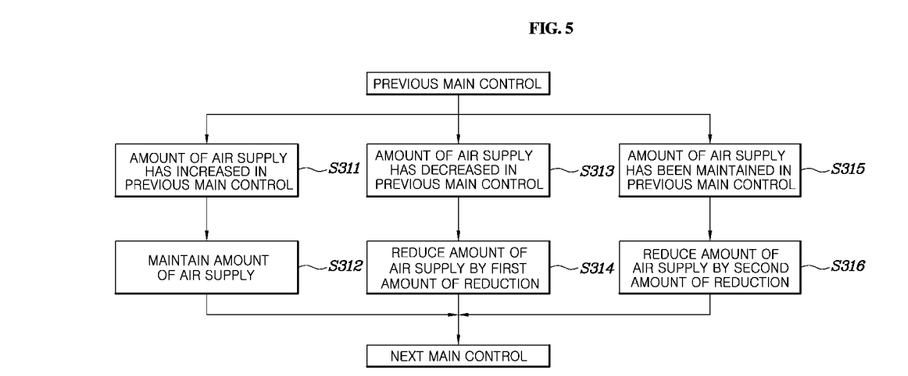
FIG. 5 is a flowchart illustrating a sub-control step in a method for controlling startup of a fuel cell vehicle according to an exemplary embodiment of the present invention.

FIGS. 1 and 2 are current-voltage graphs illustrating a goal of a method for controlling startup of a fuel cell vehicle according to an exemplary embodiment of the present invention, FIG. 3 is a block diagram of a system of a fuel cell vehicle for performing a method for controlling startup of a fuel cell vehicle according to an exemplary embodiment of the present invention, FIG. 4 is a flowchart illustrating a method for controlling startup of a fuel cell vehicle according to an exemplary embodiment of the present invention, and FIG. 5 is a flowchart illustrating a sub-control step in a method for controlling startup of a fuel cell vehicle according to an exemplary embodiment of the present invention.

FIGS. 1 and 2 are current-voltage graphs illustrating a goal of a method for controlling startup of a fuel cell vehicle according to an exemplary embodiment of the present invention. In a low-temperature start condition of a fuel cell, the fuel cell should be available for operation through maximum heating in a short period for temperature increase. During the cold start, a constant output power may be consumed through self-heating by low-efficient driving of a motor regardless of the input voltage level, and the inside temperature of the fuel cell may be increased as much as the power consumption.

In FIG. 1, an operation curve under a condition that air and hydrogen gas are sufficient is shown as ①. In this regard, when motor and inverter consume output power (a×A) shown as an area of X+Y, the fuel cell may operate at operating point ⓐ with current A and voltage a. When the fuel cell operates at ⓐ, the fuel cell may emit the internal heat of A×(c−a) shown as area M, as shown in FIG. 2. Particularly, reducing supply of the air causes a gradual degradation in performance of the fuel cell due to oxygen concentration reduction, and the operation point may move in the direction from ⓐ to ⓑ. Since the motor and inverter consumes substantially constant power, when the performance of the fuel cell is degraded, current may increase and voltage may decrease. The heating value of the fuel cell becomes B×(c−b), meaning a sharp increase in the heating value shown as area M+N. Therefore, with substantially constant output power, operation geared toward decreasing the voltage and increasing the current is highly beneficial to dissolution and temperature rising of the fuel cell.

In the meantime, even when the voltage of the fuel cell is decreased and thus power output is assisted by a high-voltage battery, when the voltage is decreased below a certain voltage level, accessories, converters, inverters, etc., may not be operated. When high-voltage parts are designed to operate at such a low voltage, a required range of voltage (current) specifications may be excessively widened, causing an increase in costs, and it is thus beneficial to configure the parts to operate only within a certain voltage range. Accordingly, the voltage of a fuel cell may be maintained at greater than a particular voltage level. Therefore, to secure cold startability of a fuel cell, constant-voltage operation at a minimum voltage level allowed by the system is required.

Furthermore, while hydrogen is normally supplied, performance may not be further improved even when the amount of air supply increases. On the contrary, when the amount of air supply starts to be reduced compared to the normal amount of supply, the performance of the fuel cell starts to decrease (e.g., degrade) and a change in performance is observed based on the amount of air supply. While the fuel cell is operated to output constant power, when an air compressor is operated at a fixed revolution per minute (rpm) within about 30% of a whole rpm range of the compressor, and an extent of opening of an air exit opening valve of the fuel cell may be adjusted to reduce the amount of air supply, time delay may occur to some extent until a change in air supply by the valve opening actually affects the fuel cell and is reflected by the fuel cell.

Accordingly, while a lower air flow is supplied than a normal air flow, the voltage of the fuel cell may fluctuate sensitively (e.g., may easily fluctuate) in response to even a minimal change in air supply, and when a change is made to the air flow based on the current voltage level, the effect of the voltage fluctuations may appear with some time delay since system response is lowered during the low air flow, and it may thus be difficult to operate the voltage in a substantially constantly desired range. Therefore, the aforementioned characteristics of a fuel cell system need to be reflected well to perform constant-voltage control.

FIG. 3 is a block diagram of a system of a fuel cell vehicle for performing a method for controlling startup of a fuel cell vehicle according to an exemplary embodiment of the present invention. When a motor 500 is constantly consuming output power A through self heating during the cold start, output power C and B may be supplied through a fuel cell 100 and a converter 300, respectively (A=B+C). In terms of temperature increase of the fuel cell, when the battery 400 is operated to be charged wherever possible (B is negative), C becomes maximized, which is beneficial to temperature increase of the fuel cell 100. In addition, when voltage E of the fuel cell 100 may be operated at a lowest voltage allowed by the system, the operating point is where the performance of temperature increase per hour would be optimal.

When the amount of air supply is excessive (e.g., greater than a predetermined amount), even when the battery 400 is operated in a charging mode and the output power consumed by the motor 500 is supplied entirely from the fuel cell 100, performance surplus may occur to the fuel cell 100 and the fuel cell 100 may be operated at voltage E>D, making it impossible to remain at a lowest voltage as described above. Further, when the amount of air supply is insufficient, performance of the fuel cell 100 to supply an output power may become insufficient, and thus the converter 300 may be operated to discharge the high-voltage battery 400 to meet the control command voltage D. Although the desired voltage D may be maintained, the high-voltage battery 400 may be discharged, i.e., a situation where B is positive, and thus the stack output C of the fuel cell 100 may be reduced. Thus, it may be difficult to maintain the heating value of the fuel cell 100 at a highest level Accordingly, to maintain voltage E to be the desired lowest voltage D while operating the battery 400 to be charged, the amount of air supply requites more accurate adjustment.

FIG. 4 is a flowchart illustrating a method for controlling startup of a fuel cell vehicle according to an exemplary embodiment of the present invention. A method for controlling startup of a fuel cell vehicle in accordance with the present invention may include starting, by a controller, to adjust a supply of hydrogen and air to a fuel cell (start prep step), in S100, setting, by the controller, a control voltage of a side of a main bus end of a converter disposed between the main bus end and a high-voltage battery to a predetermined lowest control voltage (voltage prep step), in S130, and comparing, by the controller, an output voltage of a side of a main bus end of the fuel cell and the control voltage of the side of the main bus end of the converter, and adjusting, by the controller, an amount of air supply to the fuel cell based on the comparison (main control step), in S200.

Specifically, the controller 200 may first be configured to determine whether it is in a cold start condition based on e.g., the temperature of the fuel cell in the ignition of the fuel cell. In particular, a temperature sensor of the fuel cell 100 may be used to measure the temperature of the fuel cell in the ignition thereof. When the cold start condition is detected, hydrogen and air may be supplied fast, in S110, S120. Accordingly, the controller may be configured to adjust the supply of hydrogen and air to the fuel cell 100 (S100, S110, S120) by opening a hydrogen valve 30 and an air supply valve 10. In other words, in the start prep step, the controller 200 may be configured to open the hydrogen valve 30 and the air supply valve 10 on the side of a hydrogen tank 600.

The controller 200 may then be configured to execute the voltage prep step S130 to set a control voltage of a side of a main bus end of the converter 300 disposed between the main bus end and the high-voltage battery 400 to a predetermined lowest control voltage. The converter 300 may be configured to adjust the voltage of the side of the main bus end based on the lowest control voltage set by the controller 200. The controller 200 may be configured to compare the output voltage E of a side of the main bus end of the fuel cell 100 and the control voltage D of the side of the main bus end of the converter 300, and adjust an amount of air supply to the fuel cell 100.

Specifically, the controller 200 may be configured to increase the amount of air supply to the fuel cell 100 when the output voltage E of the side of the main bus end of the fuel cell 100 remains at the control voltage D of the side of the main bus end of the converter 300. In the main control step S200, the controller 200 may be configured to decrease the amount of air supply to the fuel cell 100 when the output voltage E of the side of the main bus end of the fuel cell 100 is greater than the control voltage D of the side of the main bus end of the converter 300. Specifically, the controller 200 may be configured to determine whether the high-voltage battery 400 is in the fully charged state, and execute the main control step S200 to increase air supply to the fuel cell 100 when the high-voltage battery 400 is not in the fully charged state.

When the amount of air supply is insufficient, performance of the fuel cell 100 to supply an output power may become insufficient, and thus the converter 300 may be operated to discharge the high-voltage battery 400 to meet the control command voltage D. Although the desired voltage D may be maintained, the battery 400 may be discharged, i.e., a situation where B is positive, and thus the stack output C of the fuel cell 100 may be reduced, causing difficulty in maintaining the heating value of the fuel cell 100 at a highest level. Accordingly, it air supply to the fuel cell may be increased when the high-voltage battery 400 is not in the fully charged state.

The controller 200 may further be configured to adjust the amount of air to be supplied to the fuel cell 100 by operating the air supply valve 10 disposed at the front end of the fuel cell 100, an air blower 800, an air exhaust valve 20 at the rear end of a humidifier 700, etc. The adjustment of the amount of air flow may be executing by adjusting the revolution per minute (RPM) of the blower 800 in addition to adjusting the opening degree of the air exhaust valve 20 at the rear end of the humidifier 700. However, as for an airfoil typed compressor, it may not be operated at less than a certain RPM, making it difficult to perform constant-voltage control only by the rpm control. In this regard, a valve control approach has rapid stack voltage response rather than the RPM control approach, and may operate the air compressor at a fixed rpm, thereby reducing additional noise.

Moreover, in the main control step S200, the controller 200 may be configured to determine whether the high-voltage battery 400 is in the fully-charged stat by comparing a charging amount of the high-voltage battery 400 with a predetermined maximum charging amount of the high-voltage battery 400. Alternatively, in the main control step S200, the controller 200 may be configured to determine whether the high-voltage battery 400 is in the fully-charged stat by comparing a charging current of the high-voltage battery 400 with a predetermined maximum charging current Accordingly, the high-voltage battery 400 may be operated to be fully charged for the fuel cell to consume a load to the maximum extent Specifically, as shown in FIG. 4, the amount of air supply may be increased as much as scaled by multiplying a difference between the current charging current of the high-voltage battery 400 and the predetermined maximum charging current by a set coefficient a, in S210.

In the main control step S200, when the high-voltage battery 400 is in the fully charged state and the output voltage of the side of the main bus end of the fuel cell 100 is greater than a lowest control voltage, the controller 200 may be configured to reduce the amount of air supply to the fuel cell 100, in S220, S230. When the amount of air supply is excessive (e.g., greater than a predetermined amount), even when the battery 400 is operated in a charging mode and the output power consumed by the motor 500 is supplied entirely from the fuel cell 100, performance surplus may occur to the fuel cell 100 and in the end, the fuel cell 100 may be operated at voltage ESD to thus maintain the fuel cell 100 at a lowest voltage as described above. Accordingly, despite that the high-voltage battery 400 is in the fully charged state, when the output voltage of the side of the main bus end of the fuel cell 100 is greater than the lowest control voltage, the output voltage of the side of the main bus end of the fuel cell 100 may be reduce to the lowest control voltage by reducing the amount of air supply to the fuel cell. In particular, the current extent of opening A of the air exit opening valve of the fuel cell may be adjusted to be reduced by a predetermined constant value c, in S230. The controller 200 may also be configured to perform the main control step S200 at predetermined regular time intervals.

In the main control step S200, when the high-voltage battery 400 is in the fully charged state and the output voltage of the side of the main bus of the fuel cell is less than the lowest control voltage, when the output voltage of the side of the main bus of the fuel cell 100 increases to a level greater than the output voltage in the previous main control step S200, the controller 200 may be configured to reduce the amount of air supply to the fuel cell 100, and when the amount of air supply decreases, the controller 200 may be configured to increase the amount of air supply to the fuel cell 100, in S240.

In other words, when the battery 400 is in the fully charged state and the voltage is as low as possible, the fuel cell may be determined to be operating in a low-efficient mode for temperature increase, and this state may be maintained when the current output voltage of the side of the main bus end of the fuel cell 100 increases to a level greater than the output voltage of the side of the main bus end of the fuel cell 100 in the previous main control step S200, which is stored in a memory, and the controller 200 may be configured to reduce the amount of air supply to maintain the output voltage of the side of the main bus end of the fuel cell 100 at the lowest voltage level. Accordingly, the controller 200 may be configured to multiply a difference between the current voltage and the voltage resulting from the previous main control step by a coefficient b, and reflect the multiplication result on the extent of opening of the air exit opening valve of the fuel cell, in S240.

The controller 200 may complete startup in S300 when the temperature of the fuel cell 100 increases while performing the main control step S200. In particular, the controller 200 may be configured to detect a state in which the temperature is sufficiently increased, through e.g., a temperature sensor, or the controller 200 may be stop the startup process in response to determining that the operating point of the fuel cell 100 is in a normal state. After completion of the startup, hydrogen and air may be actively supplied to enable the vehicle to run.

FIG. 5 is a flowchart illustrating a sub-control step in a method for controlling startup of a fuel cell vehicle according to an exemplary embodiment of the present invention. A sub-control step S310 may be performed between main control steps. In the sub-control step S310, when the amount of air supply increases in the previous main control step, the amount of air supply may be maintained until the next main control step is performed, in S311, S312. Furthermore, in the sub-control step S310, when the amount of air supply is reduced in the previous main control step, the amount of air supply may be reduced by a first amount of reduction until the next main control step is performed, in S313, S314.

Moreover, in the sub-control step S310, when the amount of air supply has been maintained in the previous main control step, the amount of air supply may be reduced by a second amount of reduction, the second amount of reduction being less than the first amount of reduction, in S315, S316. The first amount of reduction may be less than an amount of reduction of the air supply in the previous control step. While the temperature of the fuel cell is increasing, as the temperature increase inside the fuel cell 100 continues, the amount of air required by the fuel cell 100 may decrease to maintain the same voltage at the same power output. Accordingly, the sub-control method may be determined taking into account this directivity of operation. When the amount of air supply has increased from the previous main control step, the increased amount of air supply may be maintained until the next main control step; otherwise, when the amount of air supply has been maintained or has decreased from the previous main control step, the amount of air supply may be minimally reduced since a situation where the required amount of air would gradually decrease over time is considered. According to exemplary embodiments of a method for controlling startup of a fuel cell vehicle, a waiting period of ignition may be reduced by rapidly increasing the temperature of the fuel cell in a cold start condition.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling startup of a fuel cell vehicle, comprising:
   starting, by a controller, to adjust supply of hydrogen and air to a fuel cell;
   setting, by the controller, a control voltage of a side of a main bus end of a converter disposed between the main bus end and a high-voltage battery to a predetermined lowest control voltage; and
   comparing, by the controller, an output voltage of the side of the main bus end of the fuel cell and the control voltage of the side of the main bus end of the converter, and adjusting, by the controller, an amount of air supply to the fuel cell based on to the comparison.

2. The method of claim 1, wherein the starting of the supply adjustment includes adjusting, by the controller, an opening of a hydrogen valve and an air valve.

3. The method of claim 1, further comprising:
   increasing, by the controller, an amount of air supply to the fuel cell when the output voltage of the side of the main bus end of the fuel cell is maintained to be the control voltage of the side of the main bus end of the converter.

4. The method of claim 1, further comprising:
   reducing, by the controller, an amount of air supply to the fuel cell when the output voltage of the side of the main bus end of the fuel cell is greater than the control voltage of the side of the main bus end of the converter.

5. The method of claim 1, further comprising:
   determining, by the controller, whether a high-voltage battery is in a fully charged state, and increasing an amount of air supply to the fuel cell if the high-voltage battery is not in the fully charged state.

6. The method of claim 5, further comprising:
   comparing, by the controller, a charging amount of the high-voltage battery with a predetermined maximum charging amount to determine whether the high-voltage battery is in the fully charged state.

7. The method of claim 5, further comprising:
   comparing, by the controller, a charging current of the high-voltage battery with a predetermined maximum charging current to determine whether the high-voltage battery is in the fully charged state.

8. The method of claim 1, further comprising:
   determining, by the controller, whether a high-voltage battery is in a fully charged state, and increasing an amount of air supply to the fuel cell when the high-voltage battery is not in the fully charged state; and
   reducing, by the controller, an amount of air supply to the fuel cell when the high-voltage battery is in the fully charged state and the output voltage of the side of the main bus end of the fuel cell is greater than a lowest control voltage.

9. The method of claim 8, wherein the adjustment of the amount of air supply is performed at predetermined regular time intervals.

10. The method of claim 9, further comprising:
    when the high-voltage battery is fully charged and the output voltage of the side of the main bus end of the fuel cell is less than the lowest control voltage, reducing, by the controller, an amount of air supply to the fuel cell when the output voltage of the side of the main bus end of the fuel cell increases to a level greater than an output voltage from a previous adjustment; and
    increasing, by the controller, an amount of air supply to the fuel cell when the output voltage of the side of the main bus end of the fuel cell decreases to a level less than the output voltage from the previous adjustment.

11. The method of claim 1, wherein the adjustment of the amount of air supply is performed at predetermined regular time intervals, and a sub-adjustment process is performed by the controller to adjust an amount of air supply based on a previous adjustment of the amount of air supply.

12. The method of claim 11, wherein the sub-adjustment includes maintaining an amount of air supply until a next adjustment is performed when the amount of air supply has increased in the previous adjustment.

13. The method of claim 11, wherein the sub-adjustment includes reducing an amount of air supply by a first amount of reduction until a next adjustment is performed when the amount of air supply has decreased in the previous adjustment.

14. The method of claim 13, wherein the first amount of reduction is less than an amount of reduction in air supply in the previous main control step.

15. The method of claim 11, wherein the sub-adjustment includes reducing an amount of air supply by a second amount of reduction until a next adjustment is performed when the amount of air supply has been maintained in the previous adjustment.

16. The method of claim 13, wherein the sub-adjustment includes reducing an amount of air supply by a second amount of reduction until a next adjustment is performed when the amount of air supply has been maintained in the previous adjustment, the second amount of reduction being less than the first amount of reduction.

17. The method of claim 1, wherein the amount of air supply to the fuel cell is adjusted by adjusting an air exit opening valve of the fuel cell.

18. The method of claim 17, wherein the amount of air supply to the fuel cell is adjusted by adjusting the air exit opening valve of the fuel cell while maintaining revolution per minute (rpm) of a blower.

19. The method of claim 17, wherein the air exit opening valve of the fuel cell includes an air exhaust valve at the rear end of a humidifier.

* * * * *